(12) United States Patent
Shen et al.

(10) Patent No.: US 11,251,823 B2
(45) Date of Patent: Feb. 15, 2022

(54) ELECTRONIC DEVICE BASE

(71) Applicant: PEGATRON CORPORATION, Taipei (TW)

(72) Inventors: Hsin-Wei Shen, Taipei (TW); Chih-Cheng Hsu, Taipei (TW); Chun-Ho Huang, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 178 days.

(21) Appl. No.: 16/544,644

(22) Filed: Aug. 19, 2019

(65) Prior Publication Data
US 2020/0177224 A1 Jun. 4, 2020

(30) Foreign Application Priority Data
Nov. 29, 2018 (TW) ................. 107142736

(51) Int. Cl.
| | |
|---|---|
| *H04B 1/3877* | (2015.01) |
| *E05B 47/00* | (2006.01) |
| *H04B 5/00* | (2006.01) |
| *G06F 1/16* | (2006.01) |
| *E05B 73/00* | (2006.01) |

(52) U.S. Cl.
CPC ....... *H04B 1/3877* (2013.01); *E05B 47/0004* (2013.01); *E05B 73/0082* (2013.01); *G06F 1/1632* (2013.01); *H04B 5/0025* (2013.01)

(58) Field of Classification Search
CPC . H04B 1/3877; H04B 5/0025; E04B 47/0004; E05B 73/0082; E05B 73/00; E05B 73/0017; E05B 7/0047; E05B 73/0052; E05B 73/0058; G06F 1/1632

USPC ......................................................... 248/551
See application file for complete search history.

(56) References Cited

U.S. PATENT DOCUMENTS

| | | | | |
|---|---|---|---|---|
| 5,619,397 A | * | 4/1997 | Honda ................. | G06F 1/1632 361/679.43 |
| 5,751,547 A | * | 5/1998 | Honda ................. | G06F 1/1632 361/679.43 |
| 6,438,229 B1 | * | 8/2002 | Overy .................. | H02J 7/0044 379/446 |

(Continued)

FOREIGN PATENT DOCUMENTS

CN 2583816 10/2003

*Primary Examiner* — Christopher Garft
(74) *Attorney, Agent, or Firm* — J.C. Patents

(57) ABSTRACT

An electronic device base includes an upper case, a lower case, a base, a first hook component and a second hook component, a solenoid valve assembly, and a near field communication assembly. The upper case has an electronic device accommodation slot; the lower case is assembled to the upper case; the base is disposed between the upper and lower cases; the first and the second hook components are both disposed at the base. When the electronic device is placed into the electronic device accommodation slot, the first and the second hook components are forced by the electronic device to move along a first direction and a second direction, respectively, so the second hook component restricts the first hook component. The near field communication component is capable of communicating with an unlocking component and driving the solenoid valve assembly to actuate the second hook component to release the first hook component.

10 Claims, 13 Drawing Sheets

(56) References Cited

U.S. PATENT DOCUMENTS

| | | | | |
|---|---|---|---|---|
| 6,581,420 B1* | 6/2003 | Ling | ................... | E05B 73/0082 |
| | | | | 248/551 |
| 6,711,921 B1* | 3/2004 | Yang | ................... | E05B 73/0082 |
| | | | | 248/551 |
| 8,264,835 B2* | 9/2012 | Tang | ................... | H05K 5/0208 |
| | | | | 361/679.43 |
| 8,269,631 B2* | 9/2012 | Yang | ................... | E05B 73/0041 |
| | | | | 340/572.1 |
| 8,605,425 B2* | 12/2013 | Zhou | ................... | H01R 13/635 |
| | | | | 361/679.43 |
| 2018/0252003 A1* | 9/2018 | Klinkman | ............. | G06F 1/1632 |

* cited by examiner

ELECTRONIC DEVICE BASE

CROSS-REFERENCE TO RELATED APPLICATION

This application claims the priority benefit of Taiwan application serial no. 107142736, filed on Nov. 29, 2018. The entirety of the above-mentioned patent application is hereby incorporated by reference herein and made a part of this specification.

BACKGROUND

Technical Field

The present invention relates to an electronic device base, and more particularly to an electronic device base having a good anti-theft effect.

Description of Related Art

Existing anti-theft locks for electronic device are usually implemented by strong stickers, magnetic locks or mechanical locks. The disadvantage of the strong stickers is that the strong stickers are difficult to be removed after being stuck, or it is inevitable that the adhesive remains on the back case of the electronic device after the removal. In addition, removal of the electronic device from the other device with a strong force may damage the back case of the electronic device.

The magnetic lock is usually unlocked by pressing the corresponding passwords. The disadvantage is that once the passwords are cracked, the electronic device is taken away.

A mechanical lock is usually outstretched outside of the base to lock with the electronic device, however, it is hideous in that way, and the electronic device may be unlocked and stolen by others using a hand tool.

SUMMARY

The invention provides an electronic device base with a good anti-theft effect.

An electronic device base adapted to accommodate an electronic device is provided. The electronic device comprises an upper case, a lower case, a base, a first hook component, a second hook component, a solenoid valve assembly, and a near field communication component. The upper case has an electronic device accommodation slot capable of accommodating the electronic device; the lower case is assembled to the upper case; the base is disposed between the upper case and the lower case; the first hook component is disposed at the base, and the first hook component is moved by the electronic device in a first direction when the electronic device is being placed in the electronic device accommodation slot; the second hook component is disposed on one side of the base, and a portion of the second hook component being exposed out of the electronic device accommodation slot of the upper case, and the second hook component is pushed by the electronic device and moving in a second direction to limit the first hook component when the electronic device is placed into the electronic device accommodation slot, wherein the first direction is perpendicular to the second direction; the solenoid valve assembly and the near field communication component are disposed on the base, and the near field communication component is capable of communicating with an unlocking component and actuating the solenoid valve assembly. After the near field communication component communicates with the unlocking component, the near field communication component actuates the solenoid valve assembly to have the second hook component release the first hook component.

In an embodiment of the invention, the first hook component includes a device hook link, a hook-stop slider, a hook-stop block, and a first spring. The device hook link is disposed on the first surface of the base facing the upper case, the base has a first sidewall, and the shape of the first sidewall is matched with the shape of the device hook link, wherein the device hook link has a hook, and the hook protrudes from the sidewall of the electronic device accommodation slot. The hook-stop slider is assembled to the device hook link by passing through the base from the bottom of the base. The hook-stop block is located under the second surface, facing the lower case, of the base, and is assembled to the hook-stop slider and movable relative to the hook-stop slider. The first spring is connected between the device hook link and the base.

In an embodiment of the invention, the hook-stop slider has a pair of first slots, and the hook-stop block has a pair of first ribs, and the pair of first ribs is embedded in the pair of first slots, and the hook-stop block is movable relative to the hook-stop slider along a third direction perpendicular to the first direction and the second direction.

In an embodiment of the invention, the hook-stop slider has a pair of second slots, the hook-stop block further has a pair of second ribs, and the pair of second ribs extends along the third direction and embedded into the second slots, the first hook component further includes a pair of second springs, sleeved on the pair of second ribs and abutting between the sidewall of the hook-stop block having the pair of second ribs and a sidewall of the hook-stop slider having the pair of second slots.

In an embodiment of the invention, the second hook component includes a hook-stop holder and a hook stop. The hook-stop holder is attached to the upper case. The hook stop is disposed on the hook-stop holder and exposed out of the electronic device accommodation slot. When the electronic device applies pressure to the hook stop, the hook stop moves toward the lower case in the second direction.

In an embodiment of the invention, a side, facing the hook stop, of the hook-stop block has a first limit protrusion, and a side, facing the hook-stop block, of the hook stop has a second limit protrusion, and the hook stop moves toward the lower case in the second direction, so that the first limit protrusion and the second limit protrusion interfere with each other.

In an embodiment of the invention, the solenoid valve assembly includes a solenoid valve, a first solenoid valve slider, a second solenoid valve slider, and a solenoid valve slider link. The solenoid valve is disposed on the first surface of the base. The first solenoid valve slider is movably disposed on the first surface of the base, connected to the solenoid valve, and is pushed by the solenoid valve. The second solenoid valve slider is movably disposed on the first surface of the base and located at one side of the first solenoid valve slider. The solenoid valve slider link is pivotally connected to the base, and the solenoid valve slider link has two ends, wherein the two respective ends are connected to the first solenoid valve slider and the second solenoid valve slider.

In an embodiment of the invention, the solenoid valve assembly further includes a third spring, the third spring has two ends, and one of the two ends is fixed to the base while the other end is connected to the second solenoid valve slider.

In an embodiment of the invention, after the near field communication component is activated, the near field communication component drives solenoid valve of the solenoid valve assembly to push the first solenoid valve slider, which causes the solenoid valve slider link to rotate and urges the second solenoid valve slider to move in the first direction.

In an embodiment of the invention, the hook-stop block has a guiding sidewall, the second solenoid valve slider has a pushing portion, the pushing portion passes through the base to face the guiding sidewall, and the pushing portion pushes the guiding sidewall to move the hook-stop block in the third direction in order to release the interference between the hook-stop block and the hook stop when the second solenoid valve slider moves in the first direction.

In an embodiment of the invention, the electronic device has a lock slot corresponding to the hook of the device hook link, and the hook is capable of being locked into the lock slot.

Based on the above, when the electronic device base of the present invention is used, the electronic device can be firmly fixed on the electronic device base by a mechanical mechanism; and a corresponding unlocking component is needed to enable the near field communication component to actuate the solenoid valve assembly for releasing the electronic device when the electronic device from the electronic device base is released. In this way, the electronic device can be prevented from being stolen.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
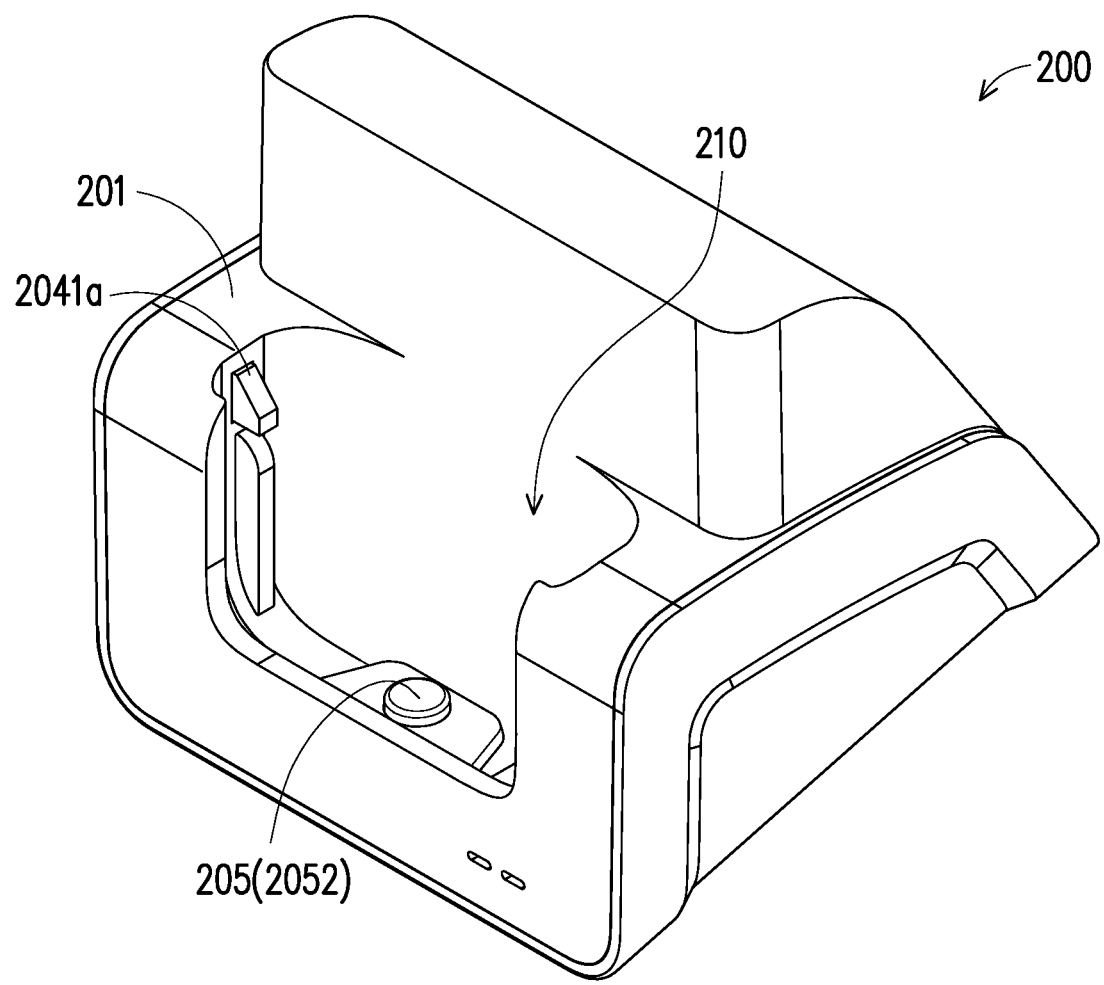
FIG. 1 illustrates a schematic view showing the combination of an electronic device base according to the present invention.
Figure 2:
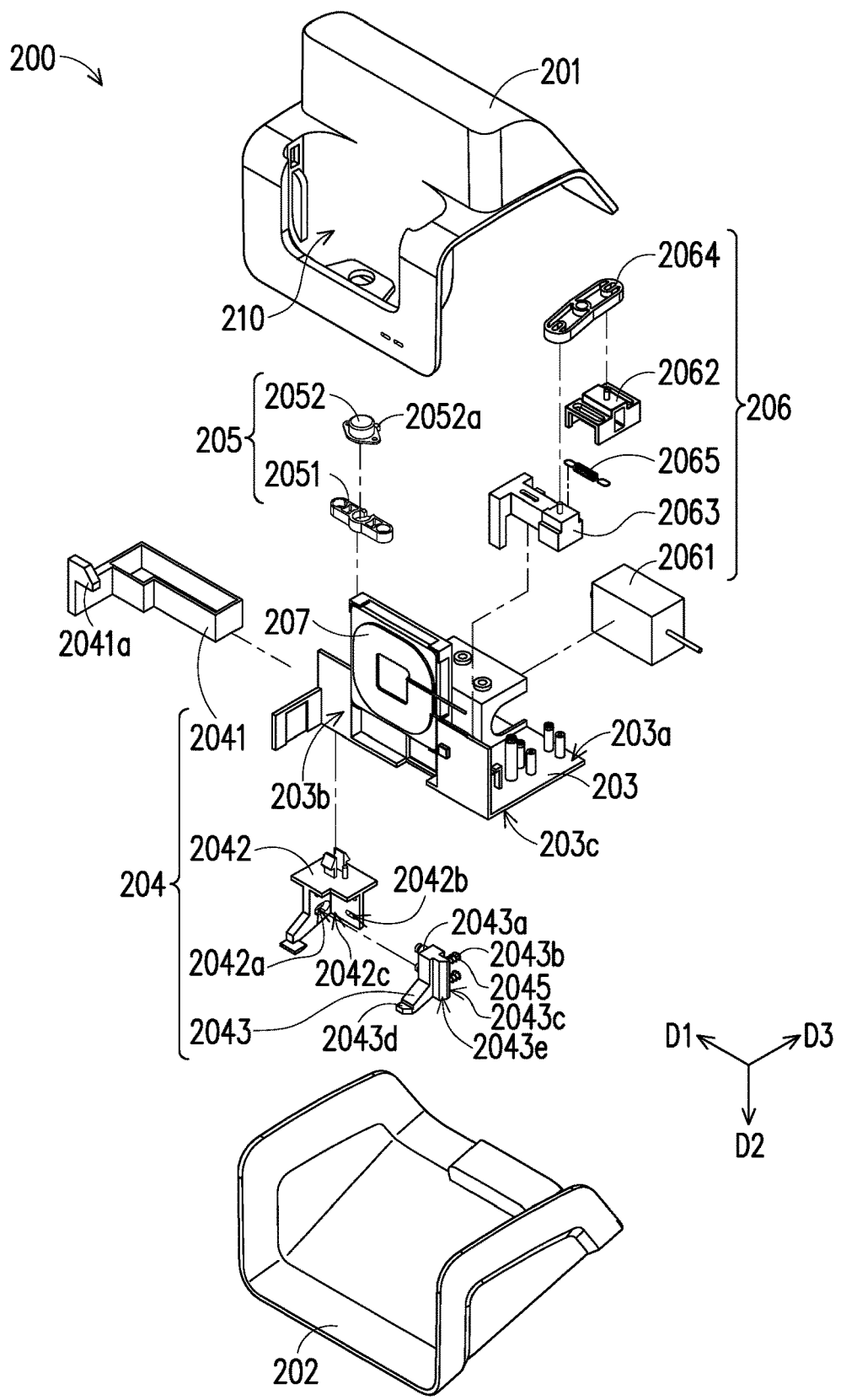
FIG. 2 illustrates an exploded view of the electronic device base of FIG. 1.
Figure 3:
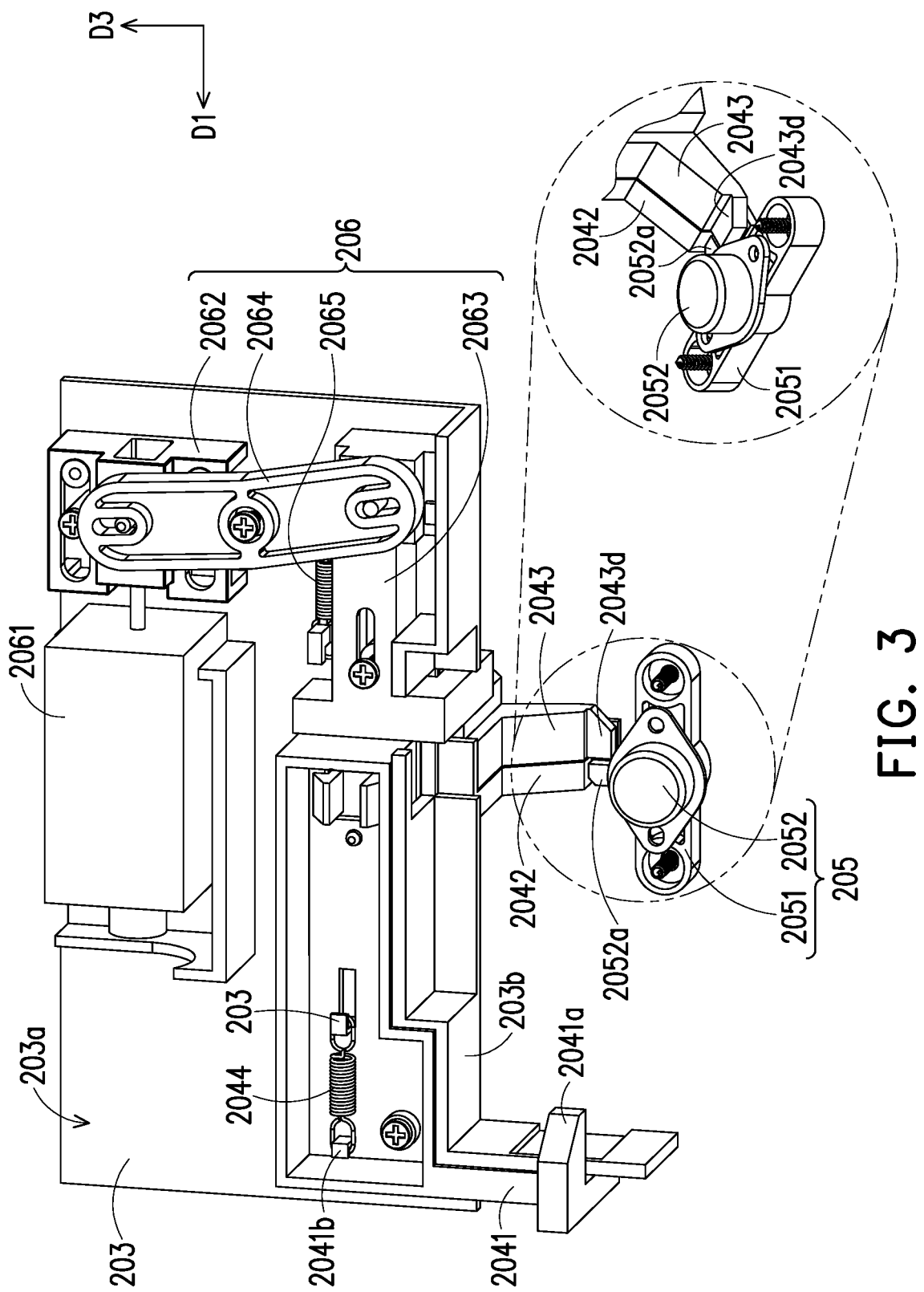
FIG. 3 illustrates a schematic view of the base, the first hook component, the second hook component and the solenoid valve assembly of FIG. 1 being assembled together.

FIG. 1 illustrates a schematic view showing an assembly of an electronic device base according to the present invention. FIG. 2 illustrates an exploded view of the electronic device base of FIG. 1. FIG. 3 illustrates a schematic view of the base, the first hook component, the second hook component and the solenoid valve assembly of FIG. 1 being assembled together. Referring to FIG. 1, FIG. 2 and FIG. 3, an electronic device base 200 is used for accommodating an electronic device 100. The electronic device 100 of the present embodiment may be a smart phone. In other embodiments, the electronic device 100 may be a tablet, so that the size of the electronic device base 200 is adaptively variable according to the requirements of the corresponding electronic device 100.

The electronic device base 200 includes an upper case 201, a lower case 202, a base 203, a first hook component 204, a second hook component 205, a solenoid valve assembly 206, and a near field communication component 207. The upper case 201 has an electronic device accommodation slot 210 adapted to accommodate the electronic device 100 (shown in FIG. 8); the base 203 is disposed between the upper case 201 and the lower case 202; the first hook component 204 is disposed at the base 203; the second hook component 205 is disposed on the front side of the base 203, and t a portion of the second hook component 205 is exposed out of the electronic device accommodation slot 210 of the upper case 201 exposes; the solenoid valve assembly 206 is placed on the base 203; and the near field communication component 207 is disposed at the base 203 and is capable of communicating with a unlocking component (not shown) and actuating the solenoid valve assembly 206.

Briefly, when the electronic device 100 is being placed in the electronic device accommodation slot 210, the first hook component 204 and the second hook component 205 are pushed by the electronic device 100 and move, wherein the first hook component 204 moves in the first direction D1 (ie, toward the left side of the electronic device base 200), and the second hook component 205 moves in the second direction D2 (ie, toward the bottom of the electronic device base 200), the aforementioned first direction D1 and the second direction D2 are perpendicular to each other, and the second hook component 205 moves downward to limit the first hook component 204 to lock the electronic device 100.

When the electronic device 100 is to be taken out from the electronic device base 200, the near field communication component 207 needs to be activated by using a unlocking component (not shown). The unlocking component (not shown) may be a magnetic card or a key, and after the near field communication component 207 is in communication with the unlocking component and then is activated, the solenoid valve assembly 206 is actuated to cause the second hook component 205 to release the first hook component 204. In this way, the electronic device 100 can be taken out from the electronic device base 200.

The components of the electronic device base 200 are further detailed below.

In detail, the first hook component 204 includes a device hook link 2041, a hook-stop slider 2042, a hook-stop block 2043, and a first spring 2044. The device hook link 2041 is disposed on the first surface 203a of the base 203 facing the upper case 201. The base 203 has a first sidewall 203b. The shape of the first sidewall 203b matches the shape of the device hook link 2041 to limit the movement path of the device hook link 2041. In addition, the device hook link 2041 has a hook 2041a, and the hook 2041a is capable of protruding out of or retracting back into the sidewall of the electronic device accommodation slot 210 according to the position of the device hook link 2041. The first spring 2044 is coupled between the device hook link 2041 and the base 203, and the elastic restoring force of the first spring 2044 can drive the device hook link 2041 to return to the original position.

In more detail, the device hook link 2041 further has a first spring hook 2041b, and the base 203 is provided with a second spring hook 203d in the section enclosed by the device hook link 2041, and the foregoing first spring 2044 is connected between the first spring hook 2041b and the second spring hook 203d.

The aforementioned hook-stop slider 2042 is assembled to the device hook link 2041 by passing through the base 203 from the bottom of the base 203. More specifically, the hook-stop slider 2042 has two duckbill-shaped hooks (not shown), the hooks are opposite in direction, and the base 203 and the device hook link 2041 have openings that overlap with each other (not marked), and the hooks pass through the openings to assemble the hook-stop slider 2042 to the device hook link 2041.

The hook-stop block 2043 is located at the base 203 facing a second surface 203c of the lower case 202 (shown in FIG. 6), and the hook-stop block 2043 is assembled to the hook-stop slider 2042 and capable of moving relative to the hooked stop slider 2042.

In detail, the hook-stop slider 2042 has a pair of first slots 2042a, and the first slots 2042a goes thoroughly in the first direction D1. The hook-stop block 2043 has a pair of first ribs 2043a extending along the first direction D1, and the first ribs 2043a are correspondingly embedded in the first slots 2042a. The first ribs 2043a are inserted into the first slots 2042a and are movable in the first slots 2042a, so that the hook-stop block 2043 moves along a third direction D3 in relative to the hook-stop slider 2042. The third direction D3 is perpendicular to the first direction D1 and the second direction D2. That is, the third direction D3 is the direction toward the rear of the electronic device base 200.

In addition, the hook-stop slider 2042 further has a pair of second slots 2042b going thoroughly in the third direction D3, and the hook-stop block 2043 further has a pair of second ribs extending along the third direction D3. The second ribs 2043b are correspondingly embedded in the second slots 2042b and further extended into the second slots 2042b along the third direction D3. Moreover, the first hook component 204 further includes a pair of second springs 2045, the second springs 2045 are sleeved outside the second ribs 2043b and abut between the sidewall 2043c of the hook-stop block 2043 provided with the second ribs 2043b and the sidewall 2042c of the hook-stop slider 2042 provided with the second slots 2042b. The second springs 2045 provide an elastic restoring force to allow the second ribs 2043b to slightly withdraw from the second slots 2042b along the third direction D3.

As seen above, the second hook component 205 includes a hook-stop holder 2051 and a hook stop 2052. The hook-stop holder 2051 is locked to the upper case 201. The hook stop 2052 is disposed on the hook-stop holder 2051, and t the hook stop 2052 is exposed out of the electronic device accommodation slot 210, so the hook stop 2052 can be in contact with the electronic device 100.

One side of the hook-stop block 2043, facing the hook stop 2052, has a first limit protrusion 2043d, and one side of the hook stop 2052, facing the hook-stop block 2043, has a second limit protrusion 2052a. The first limit protrusion 2043d and the second limit protrusion 2052a interfere with each other after the hook stop 2052 moves toward the lower case 202 in the second direction D2, such that the second hook component 205 limits the first hook component 204.

The solenoid valve assembly 206 includes a solenoid valve 2061, a first solenoid valve slider 2062, a second solenoid valve slider 2063, and a solenoid valve slider link 2064. The solenoid valve 2061 is disposed on the first surface 203a of the base 203. The first solenoid valve slider 2062 is movably disposed on the first surface 203a of the base 203, connected to the solenoid valve 2061, and is pushed by the solenoid valve 2061. The second solenoid valve slider 2063 is movably disposed on the first surface 203a of the base 203 and is located on one side of the first solenoid valve slider 2062. The solenoid valve slider link 2064 is pivotally connected to the base 203, and the two ends of the solenoid valve slider link 2064 are correspondingly connected to the first solenoid valve slider 2062 and the second solenoid valve slider 2063.

The solenoid valve assembly 206 further includes a third spring 2065 with one end fixed to the base 203 and the other end connected to the second solenoid valve slider 2063. When the first solenoid valve slider 2062 drives the second solenoid valve slider 2063 to move, the third spring 2065 is elongated and pre-stores the elastic restoring force. When the external force (ie, the force which the solenoid valve 2061 applies to the first solenoid valve slider 2062 and pushes the first solenoid valve slider 2062) disappears, the elastic restoring force of the third spring 2065 returns the second solenoid valve slider 2063 to the original position.

The near field communication component 207 is used to sense a unlocking component (not shown), and when the unlocking component (not shown) is sensed, the near field communication component 207 actuates the solenoid valve assembly 206, so that the solenoid valve 2061 pushes the first solenoid valve slider 2062, and the solenoid valve slider link 2064 connected to the first solenoid valve slider 2062 rotates to drive the second solenoid valve slider 2063 to move in the first direction D1.

Incidentally, the hook-stop block 2043 has a guiding sidewall 2043e, and the second solenoid valve slider 2063 has a pushing portion 2063a. The pushing portion 2063a passes through the base 203 and faces the guiding sidewall 2043e, so when the second solenoid valve slider 2063 moves in the first direction D1, the interference between the pushing portion 2063a and the guiding sidewall 2043e pushes the hook-stop block 2043 to move in the third direction D3, so as to release the interference between the hook-stop block 2043 and the hook stop 2052, thereby achieving the purpose of releasing the electronic device 100 from the electronic device base 200.

In the following description, textual descriptions come with proper drawings to help the reader understand how the electronic device base 200 locks and releases the electronic device 100.

Figure 4:
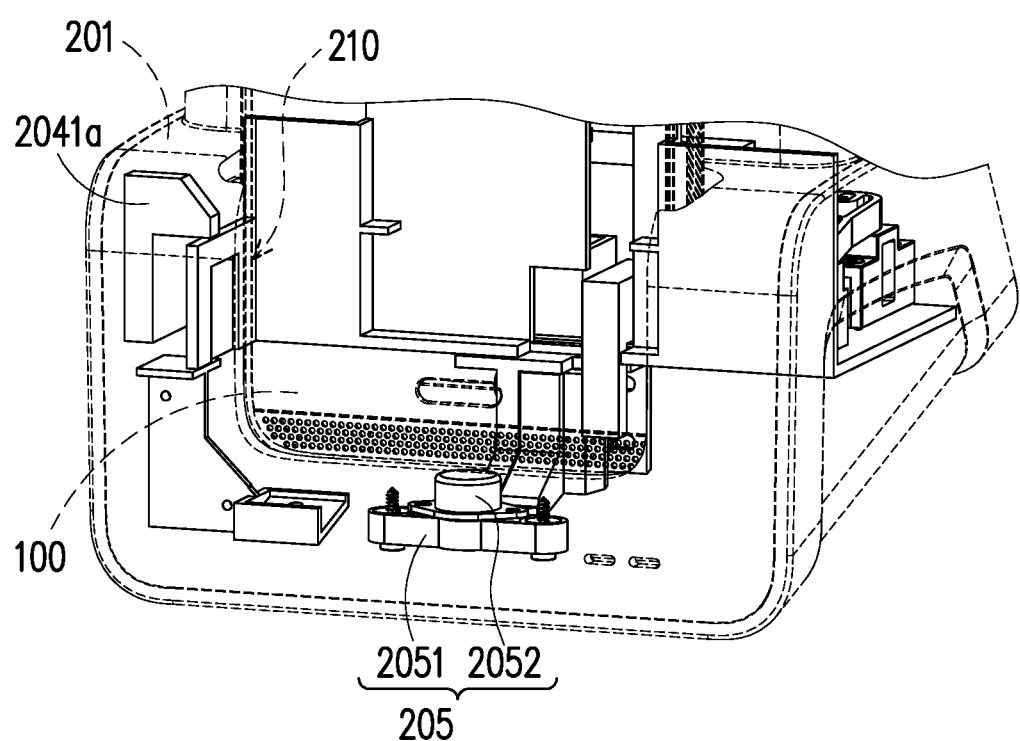
FIG. 4 illustrates a schematic view of the electronic device being placed in the electronic device base.
Figure 5:
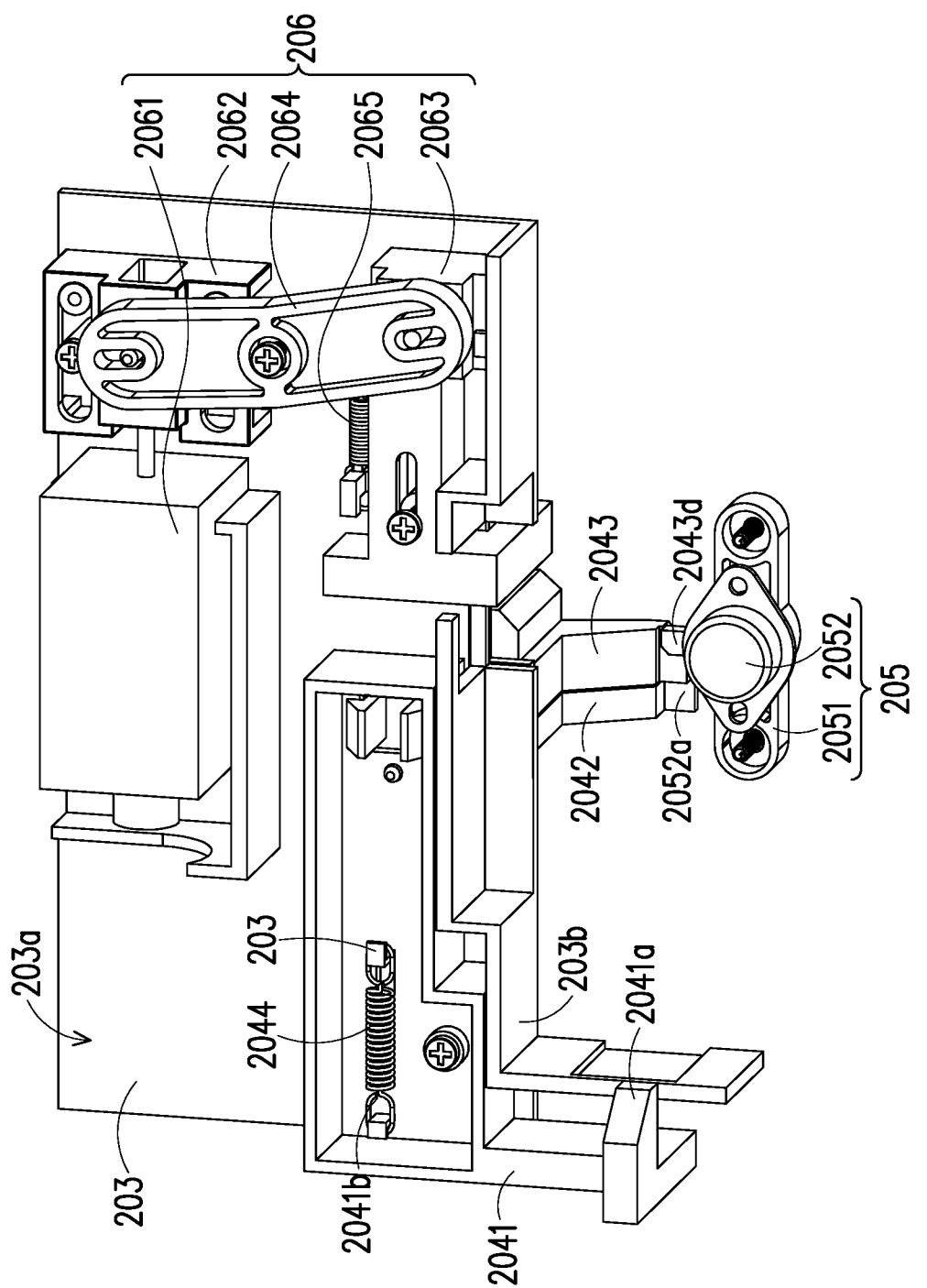
FIG. 5 illustrates a schematic diagram of the operation of the assembly shown in FIG. 3.
Figure 6:
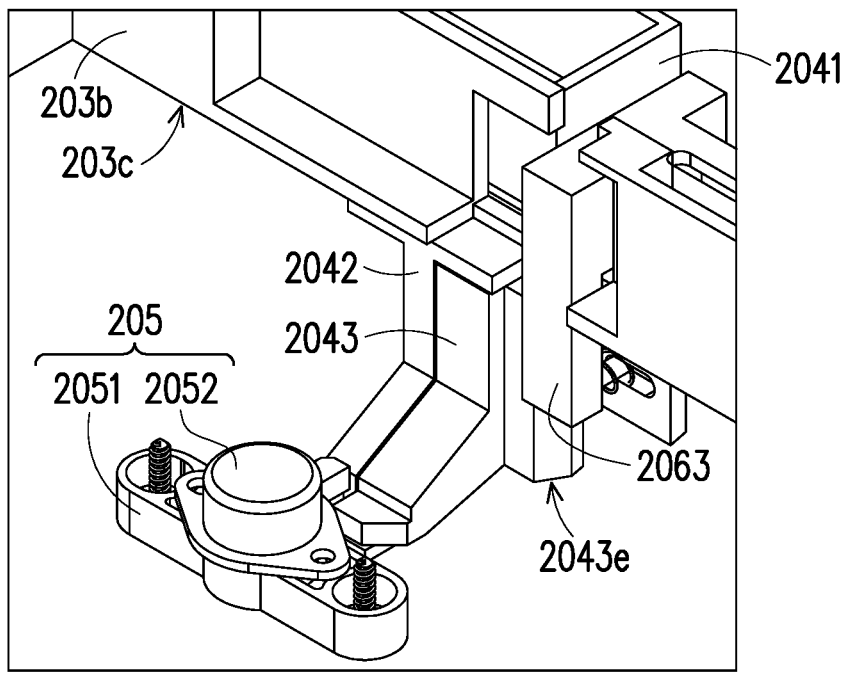
FIG. 6 illustrates a partial enlarged view of FIG. 5.
Figure 7:
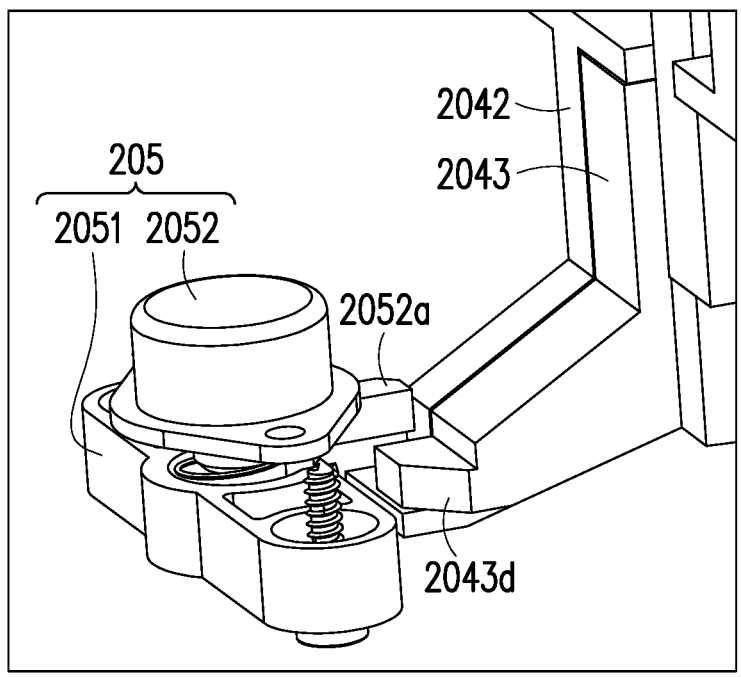
FIG. 7 illustrates a schematic view of the second hook component and the first hook component shown in FIG. 6.

FIG. 4 illustrates a schematic view of the electronic device being placed in the electronic device base. FIG. 5 illustrates a schematic diagram of the assembly operation in FIG. 3. FIG. 6 illustrates a partial enlarged view of FIG. 5. FIG. 7 illustrates a schematic view of the second hook component and the first hook component shown in FIG. 6. Referring to FIG. 4, FIG. 5 and FIG. 6, when the electronic device 100 is being placed in the electronic device accommodation slot 210, the side of the electronic device 100 first contacts the hook 2041a of the device hook link 2041, and the deeper the electronic device 100 goes in the electronic device accommodation slot 210, the farther the electronic device 100 pushes the hook 2041a to move the first direction D1, which drives the device hook link 2041 to move in the first direction D1.

In particular, as shown in FIG. 6 and FIG. 7, when the device hook link 2041 moves in the first direction D1, the hook-stop block 2043 and the hook-stop slider 2042 are subjected to the device hook link 2041 and move together in the first direction D1. At this moment, the second hook component 205 has not yet been pressed by the electronic device 100 in the second direction D2, so the first limit protrusion 2043d of the hook-stop block 2043 and the second limit protrusion 2052a of the hook stop 2052 are staggered, and the movement of the hook-stop block 2043 and the hook-stop slider 2042 is not limited by the hook stop 2052.

Figure 8:
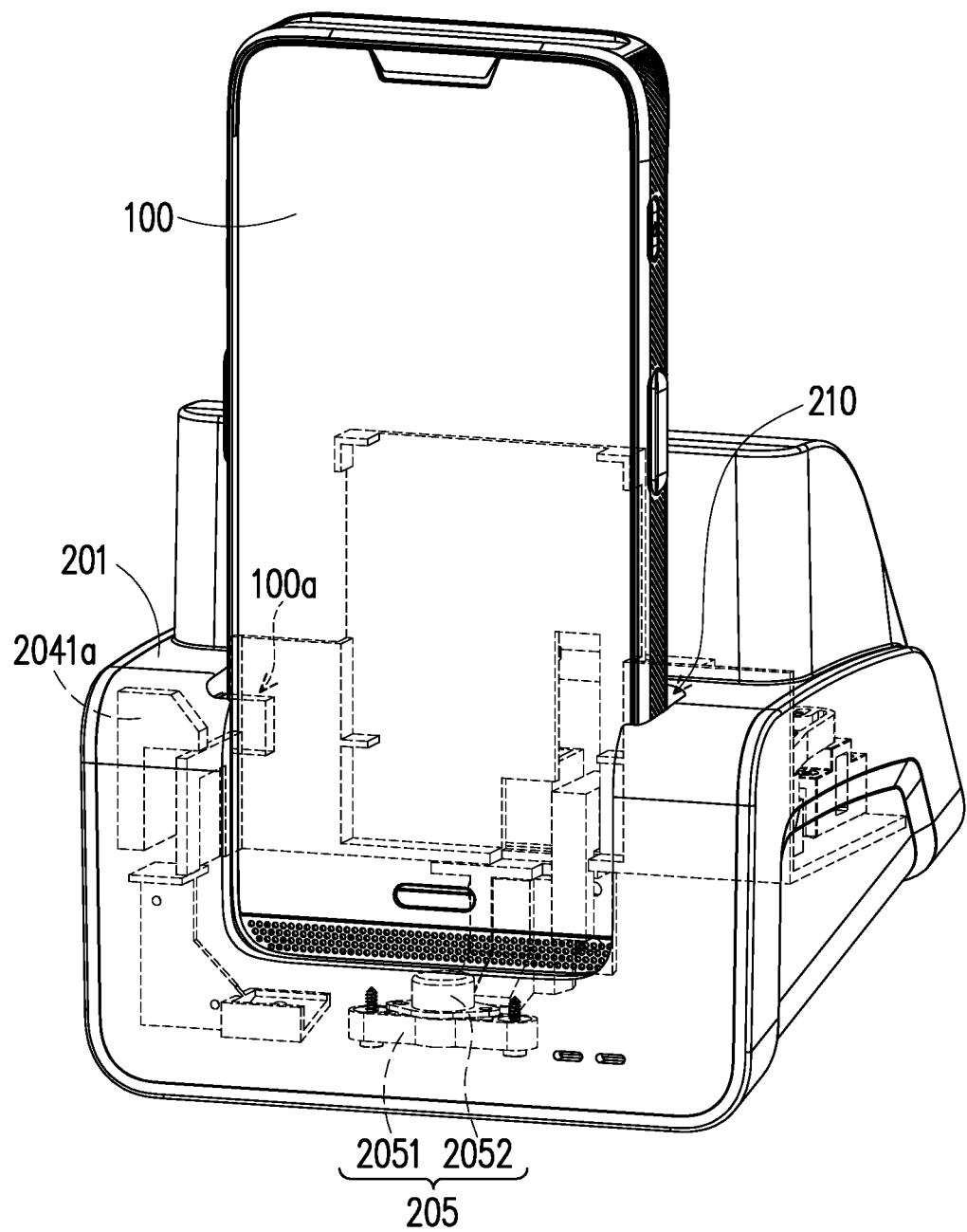
FIG. 8 illustrates a schematic view of the electronic device being completely placed in the electronic device accommodation slot.
Figure 9:
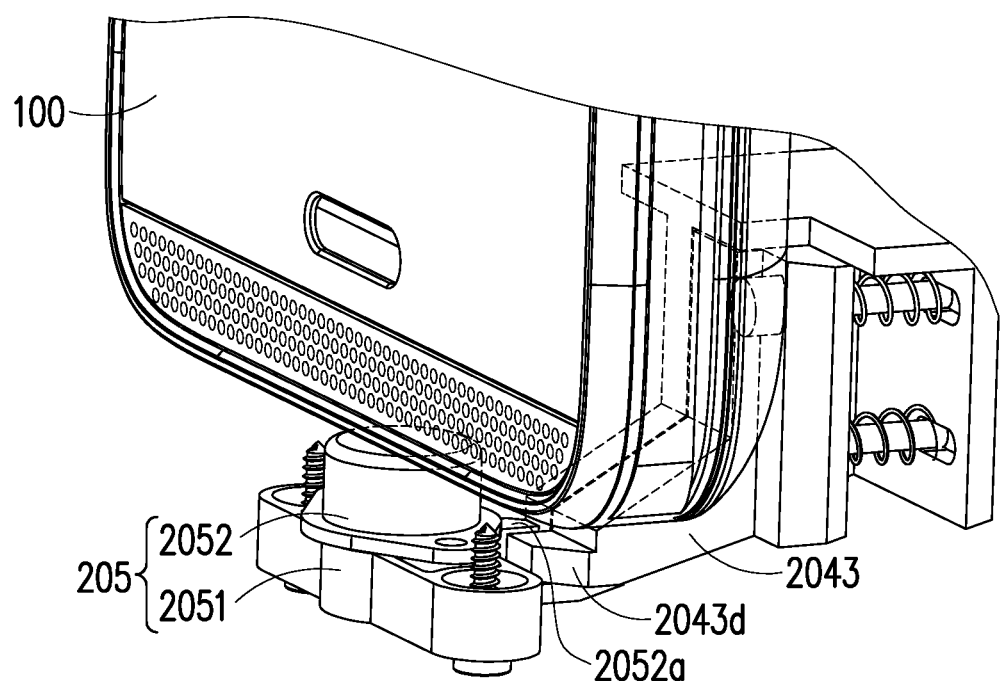
FIG. 9 illustrates a schematic view of the hook-stop blocking the hook-stop block.

FIG. 8 illustrates a schematic view of the electronic device 100 being completely placed in the electronic device accommodation slot 210. FIG. 9 illustrates a schematic view of the hook stop 2052 blocking the hook-stop block 2043. Please refer to FIG. 8 and FIG. 9, as the electronic device 100 placed in the electronic device accommodation slot 210 goes deeper, the electronic device 100 eventually touches the hooking stop of the second hook component 205, and a pressure from a self-weight of the electronic device 100 applies to the hook stop 2052. The hook stop 2052 moves toward the lower case 202 in the second direction D2. At this moment, the second limit protrusion 2052a of the hook stop 2052 interferes with the first limit protrusion 2043d of the hook-stop block 2043, so the hook-stop block 2043 is blocked by the hook stop 2052 and cannot continue to move in the first direction D1, and therefore the position of the device hook link 2041 is restricted.

It is known that the positions of the first hook component 204 and the second hook component 205 are fixed due to the mutual interference of the first hook component 204 and the second hook component 205, wherein the electronic device 100 is provided with lock slot 100a corresponding to the position of the hook 2041a. The hook 2041a is locked into the lock slot 100a as t the first hook component 204 moves, so that the electronic device 100 is locked with the electronic device base 200 by snapping the hook 2041a into the lock slot 100a.

It is worth noting that since the hook 2041a is snapped into the lock slot 100a, even if another person uses a hand tool to poke the hook 2041a, or wants to steal the electronic device 100 from the electronic device base 200 with the hand tool. It is impossible to achieve.

If the user wants to remove the electronic device 100 from the electronic device base 200, the near field communication component 207 could be activated by using a unlocking component (not shown), wherein the unlocking component (not shown) may be a magnetic card or a key, and the unlocking component (not shown) is set to remain in an activated state for a period of time, such as 30 seconds or 1 minute, etc. after the near field communication component 207 is activated, so that the activated near field communication component 207 drives the solenoid valve assembly 206 to continue operating.

Figure 10:
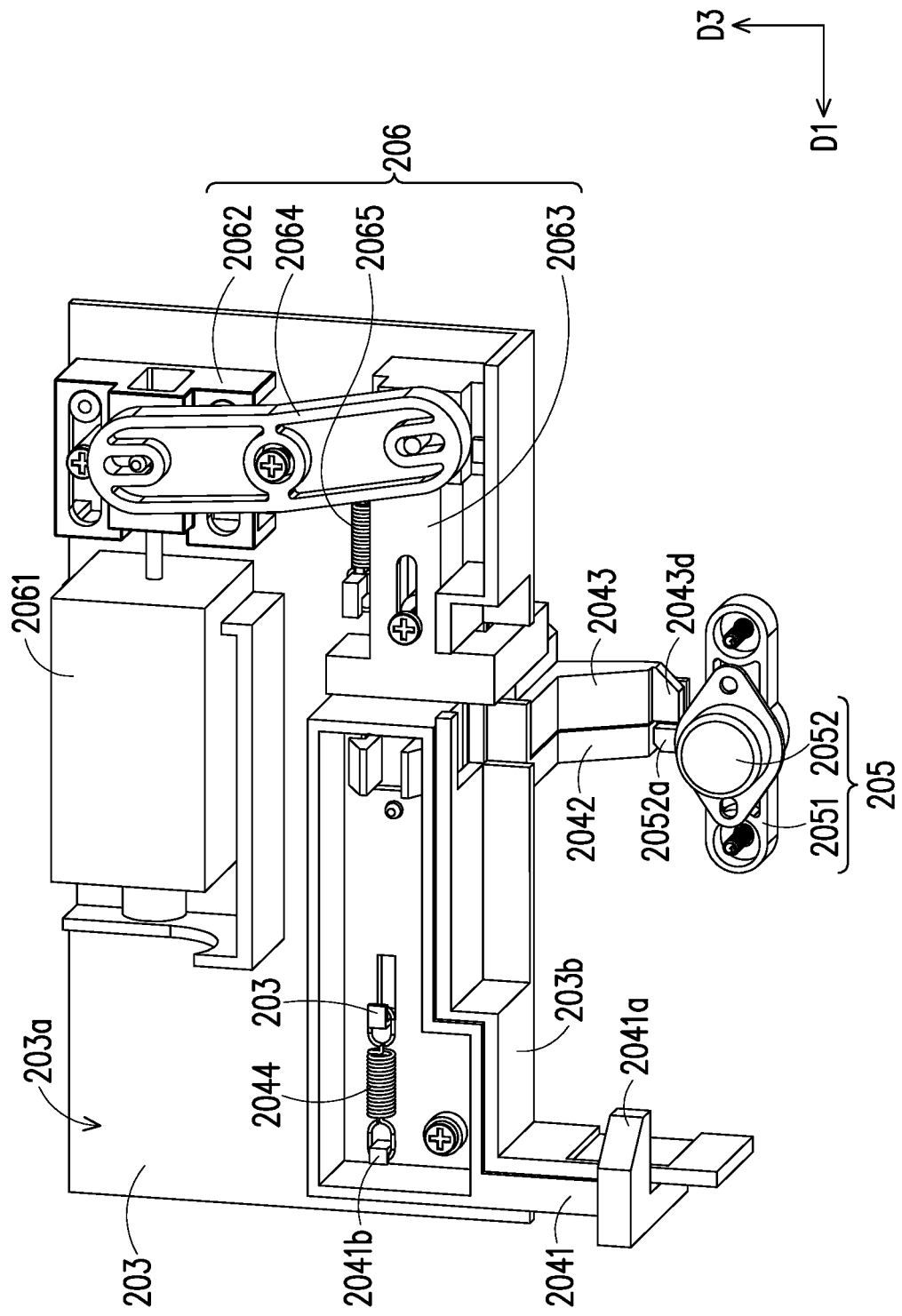
FIG. 10 and FIG. 11 illustrate schematic diagrams of the actuation of the solenoid valve assembly.
Figure 11:
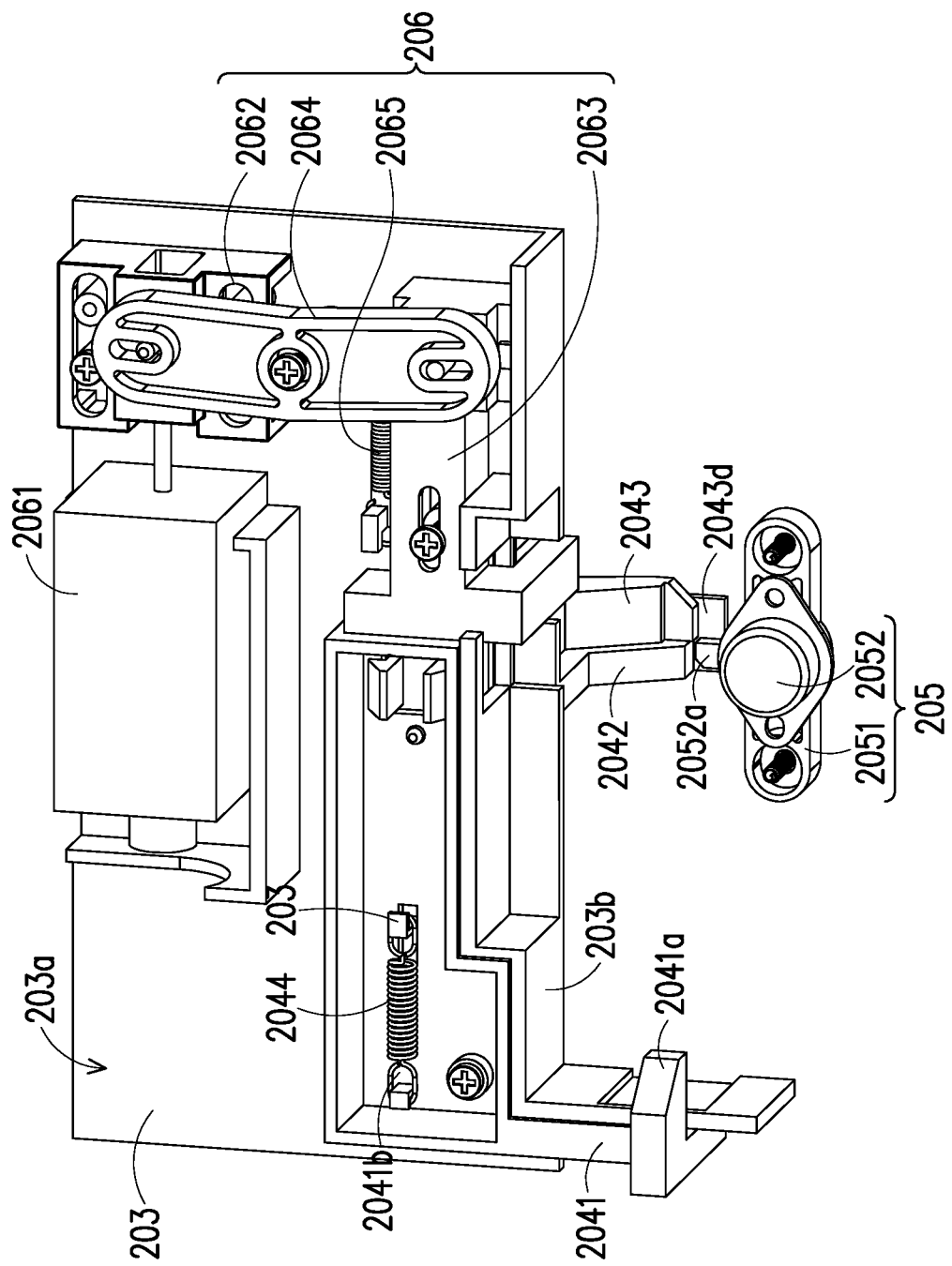

FIG. 10 and FIG. 11 illustrate schematic diagrams of the operation of the solenoid valve assembly. Referring to FIG. 10 and FIG. 11, the foregoing description "the activated near field communication component 207 drives the solenoid valve assembly 206 to continue operating" means that the stem of the solenoid valve 2061 extends a predetermined length and remain at the predetermined length during a period of time after the solenoid valve assembly 206 is actuated. The stem extends to push the first solenoid valve slider 2062 connected with the stem of the solenoid valve 2061, so that the first solenoid valve slider 2062 moves in a reverse direction against the first direction D1; That maintaining the predetermined length for a period of time is to prevent the retraction of the stem from bringing the first solenoid valve slider 2062 back to the original position and affecting the operation of the subsequent components.

Since the central portion of the solenoid valve slider link 2064 is pivotally connected to the base 203 and the respective ends are connected to the first solenoid valve slider 2062 and the second solenoid valve slider 2063. When the first solenoid valve slider 2062 moves in a reverse direction against the first direction D1, the solenoid valve slider link 2064 is driven by the movement of the first solenoid valve slider 2062 and rotates around a central portion thereof, a rotation axis, pivoted to the base 203, thereby driving the second solenoid valve slider 2063 to move in the first direction D1.

Figure 12A:
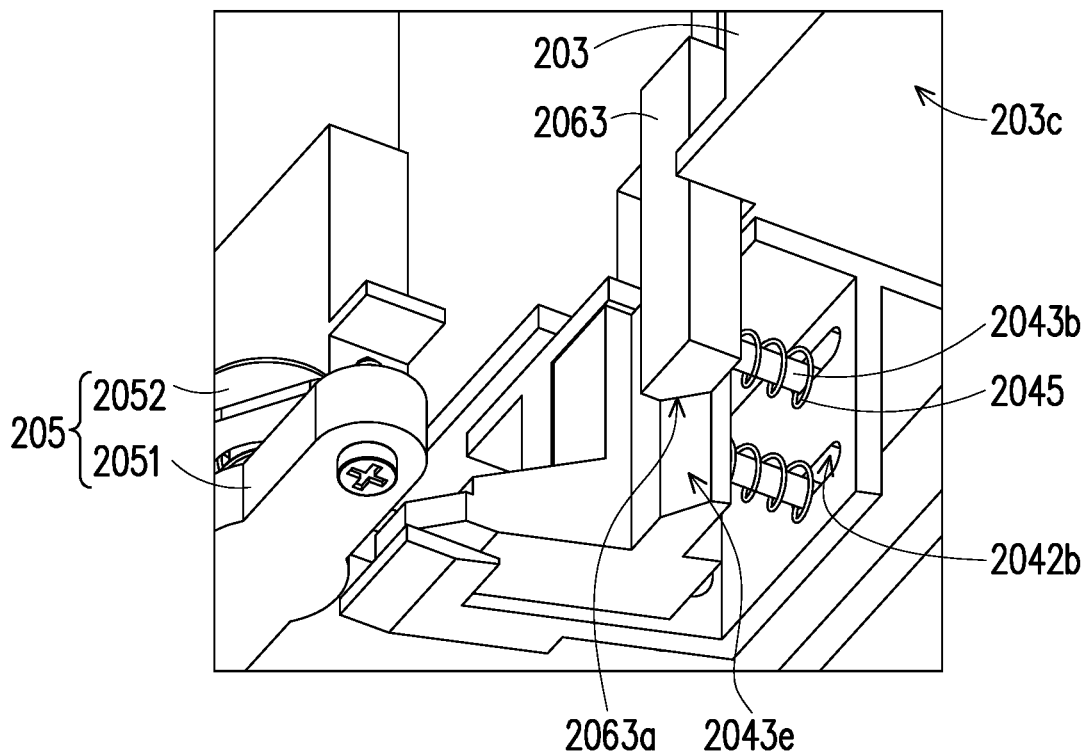
FIG. 12A, FIG. 12B and FIG. 12C illustrate schematic diagrams showing the movement of the hook-stop slider of the first hook component in the third direction by the second solenoid valve block.
Figure 12B:
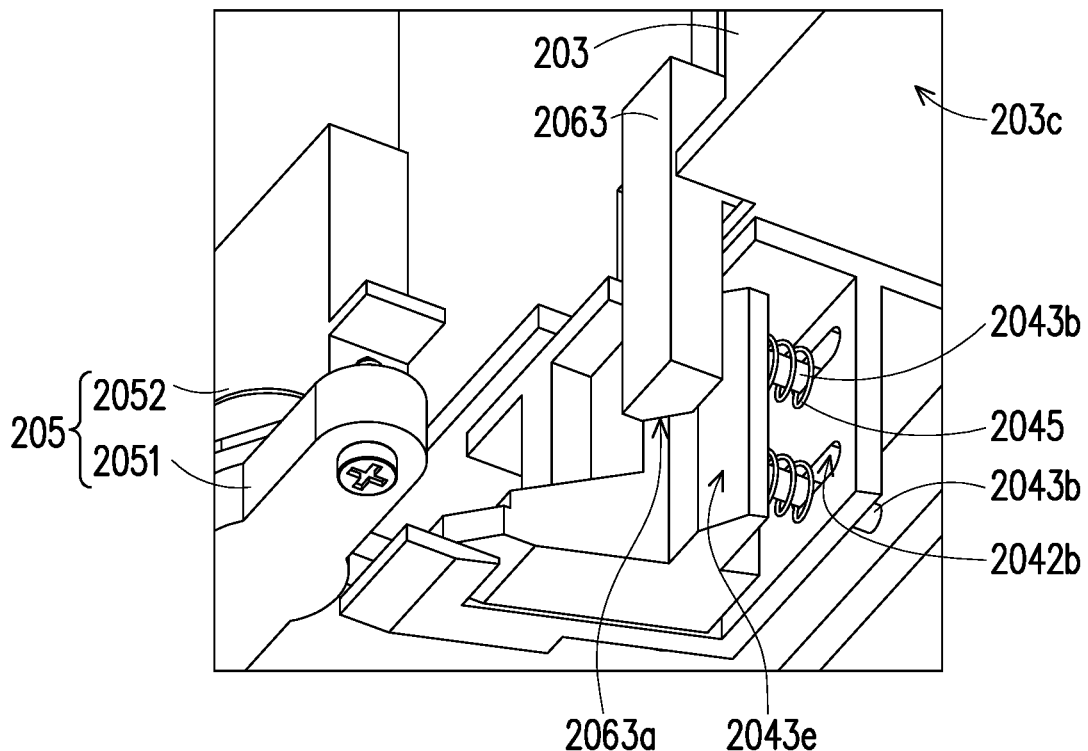
Figure 12C:
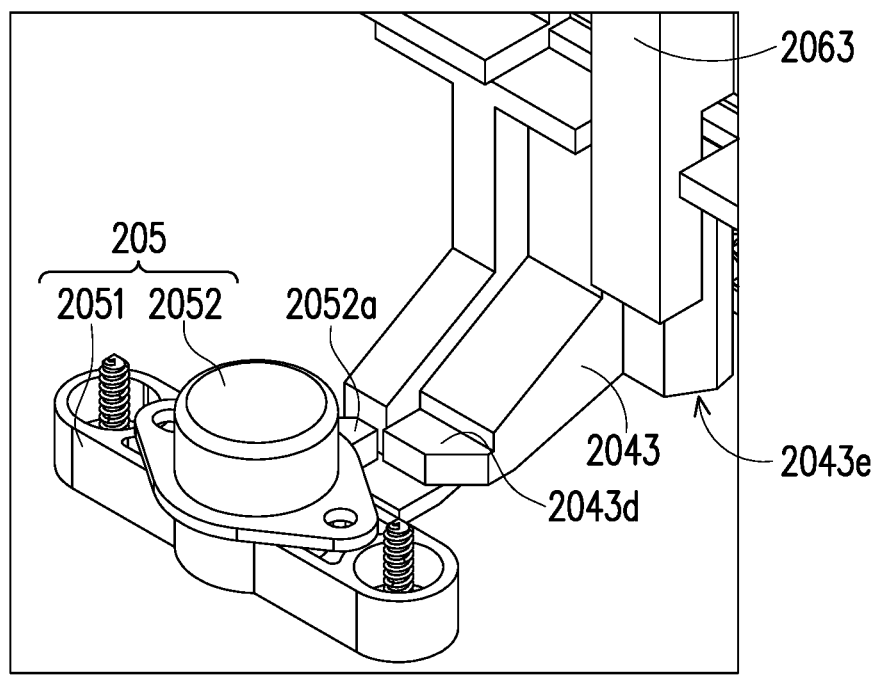

FIG. 12A, FIG. 12B and FIG. 12C illustrate schematic diagrams showing the movement of the hook-stop slider of the first hook component in the third direction pushed by the second solenoid valve block. Referring to FIG. 12A, FIG. 12B and FIG. 12C together, while the second solenoid valve slider 2063 is moving in the first direction D1, the pushing portion 2063a of the second solenoid valve slider 2063 contacts the guiding sidewall 2043e of the hook-stop block 2043. Therefore, as the second solenoid valve slider 2063 moves closer to the device hook link 2041 in the first direction D1, the second solenoid valve slider 2063 pushes the hook-stop block 2043 to move in the third direction D3 due to the interference between the pushing portion 2063a of the second solenoid valve slider 2063 and the guiding sidewall 2043e of the hook-stop block 2043.

In detail, when the second solenoid valve slider 2063 pushes the hook-stop block 2043 to move in the third direction D3, the first ribs 2043a of the hook-stop block 2043 are correspondingly inserted into the first slots 2042a of the hook-stop slider 2042. Therefore, the hook-stop block 2043 can smoothly move in the first direction D1 relative to the hook-stop slider 2042 because the moving of the first ribs 2043a in the first slots 2042a.

In addition, as the second solenoid valve slider 2063 pushes the hook-stop block 2043, the second ribs 2043b of the hook-stop block 2043 embedded in the second slots 2042b of the hook-stop slider 2042 go deeper into the second slots 2042b. Meanwhile, the second springs 2045, which sleeve on the second ribs 2043b and abut between the sidewall 2042c having the second slots 2042b of the hook-stop slider 2042 and the sidewall 2043c having the second ribs 2043b of the hook-stop block 2043, stores the elastic restoring force.

As the second solenoid valve slider 2063 pushes the hook-stop block 2043 to move along the third direction D3, interference between the second limit protrusion 2052a of the hook stop 2052 and the first limit protrusion 2043d of the hook-stop block 2043 is gradually released.

Figure 13:
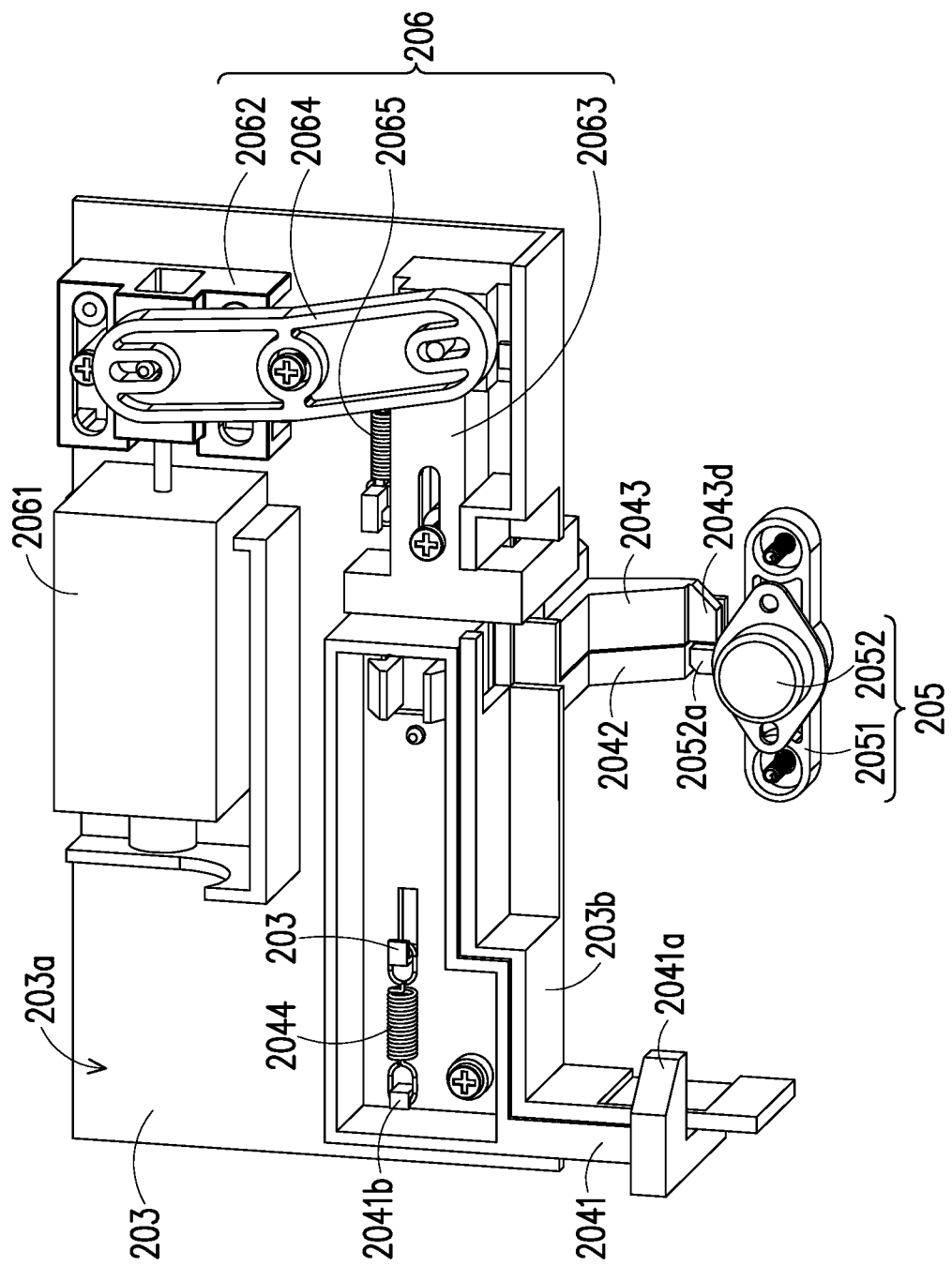
FIG. 13 illustrates a schematic view of the first hook component, the second hook component and the solenoid valve assembly restored to the original position.

FIG. 13 illustrates a schematic view of the first hook component, the second hook component and the solenoid valve assembly restored back to the original position. Referring to FIG. 13, after the unlocking component (not shown) leaves the near field communication component 207 for a period of time, the near field communication component 207 is turned off, and the stem of the solenoid valve 2061 is retracted and drives the first solenoid valve slider 2062 to return to the original position. At this moment, the elastic restoring force stored by the third spring 2065 between the base 203 and the second solenoid valve slider 2063 allows the second solenoid valve slider 2063 to return to the original position, and the elastic restoring force stored by the first spring 2044 allows the device hook link 2041 to return to the original position. At this time, the electronic device base 200 no longer locks the electronic device 100, so the electronic device 100 could be taken out from the electronic device base 200.

In summary, the electronic device base of the present invention contacts the first hook component and presses the second hook component through the electronic device and the self-weight of the electronic device to make the first hook component and the second hook components mutually locked with each other, securing the electronic device on the electronic device base. Since no components are exposed outside the upper case or the lower case, nobody can use hand tools to forcibly release the electronic device from the electronic device base.

For unlocking, a corresponding unlocking component (such as a magnetic card or a key) is required to activate the near field communication component to actuate the solenoid valve assembly and unlock the electronic device.

Therefore, in addition to the user having the unlocking component, it is difficult for others to use hand tools to forcibly release the electronic device from the electronic device base, thereby effectively preventing the electronic device from being stolen.

It will be apparent to those skilled in the art that various modifications and variations can be made to the disclosed embodiments without departing from the scope or spirit of the disclosure. In view of the foregoing, it is intended that the disclosure cases modifications and variations provided that they fall within the scope of the following claims and their equivalents.

What is claimed is:

1. An electronic device base adapted to accommodate an electronic device, comprising:
   an upper case, having an electronic device accommodation slot for accommodating the electronic device;
   a lower case, assembled to the upper case;
   a base, disposed between the upper case and the lower case;
   a first hook component, disposed at the base, and the first hook component is moved by the electronic device in a first direction when the electronic device is being placed in the electronic device accommodation slot;
   a second hook component, disposed on a side of the base, and a portion of the second hook component being exposed out of the electronic device accommodation slot of the upper case, the second hook component being pushed by the electronic device and moving in a second direction to limit the first hook component when the electronic device is being placed into the electronic device accommodation slot, wherein the first direction is perpendicular to the second direction;
   a solenoid valve assembly, disposed on the base; and
   a near field communication component, disposed on the base, the near field communication component actuating the solenoid valve assembly to have the second hook component release the first hook component,
   wherein the first hook component comprises:
   a device hook link, disposed on a first surface of the base facing the upper case, wherein the device hook link has a hook, and the hook protrudes from a sidewall of the electronic device accommodation slot;
   a hook-stop slider, assembled to the device hook link by passing through the base from the bottom of the base;
   a hook-stop block, located under a second surface, facing the lower case, of the base and assembled to the hook-stop slider and movable relative to the hook-stop slider; and
   a first spring, connected between the device hook link and the base.

2. The electronic device base of claim 1, wherein the hook-stop slider has a pair of first slots, and the hook-stop block has a pair of first ribs, the pair of first ribs is embedded in the pair of first slots, and the hook-stop block is movable relative to the hook-stop slider along a third direction perpendicular to the first direction and the second direction.

3. The electronic device base of claim 2, wherein the hook-stop slider has a pair of second slots, the hook-stop block further has a pair of second ribs extending along the third direction and embedded into the pair of second slots, and the first hook component further includes a pair of second springs sleeved on the pair of second ribs and abutting between a sidewall of the hook-stop block having the pair of second ribs and a sidewall of the hook-stop slider having the pair of second slots.

4. The electronic device base of claim 1, wherein the second hook component comprises:
   a hook-stop holder, attached to the upper case; and
   a hook stop, disposed on the hook-stop holder and exposed out of the electronic device accommodation slot, the hook stop moving toward the lower case in the second direction when the electronic device applying pressure to the hook stop.

5. The electronic device base of claim 4, wherein a side, facing the hook stop, of the hook-stop block is provided with a first limit protrusion, a side, facing the hook-stop block, of the hook stop is provided with a second limit protrusion, and the hook stop moves toward the lower case in the second direction to make the first limit protrusion and the second limit projection interfere with each other.

6. The electronic device base of claim 4, wherein the solenoid valve assembly comprises:
   a solenoid valve, disposed on the first surface of the base;
   a first solenoid valve slider, movably disposed on the first surface of the base, connected to the solenoid valve, and pushed by the solenoid valve;
   a second solenoid valve slider, movably disposed on the first surface of the base and located at one side of the first solenoid valve slider; and
   a solenoid valve slider link, pivotally connected to the base, the solenoid valve slider link having two ends, and the two respective ends being connected to the first solenoid valve slider and the second solenoid valve slider.

7. The electronic device base of claim 6, wherein the solenoid valve assembly further comprises a third spring having two ends, and one of the two ends is fixed to the base while the other one of the two ends is connected to the second solenoid valve slider.

8. The electronic device base of claim 6, wherein after the near field communication component is activated, the near field communication component drives the solenoid valve of the solenoid valve assembly to push the first solenoid valve slider, which causes the solenoid valve slider link to rotate and urges the second solenoid valve slider to move in the first direction.

9. The electronic device base of claim 8, wherein the hook-stop block has a guiding sidewall, the second solenoid valve slider has a pushing portion, the pushing portion passes through the base to face the guiding sidewall, and the pushing portion pushes the guiding sidewall to move the hook-stop block in the third direction in order to release the interference between the hook-stop block and the hook stop when the second solenoid valve slider moves in the first direction.

10. The electronic device base of claim 1, wherein the electronic device has a lock slot corresponding to the hook of the device hook link, and the hook is capable of being locked into the lock slot.

\* \* \* \* \*